Jan. 2, 1940.  G. A. LYON  2,185,468
ORNAMENTAL BUMPER ACCESSORY
Filed July 29, 1937
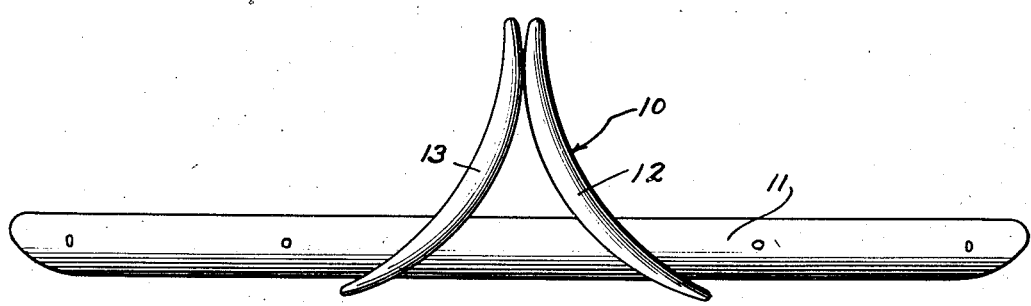
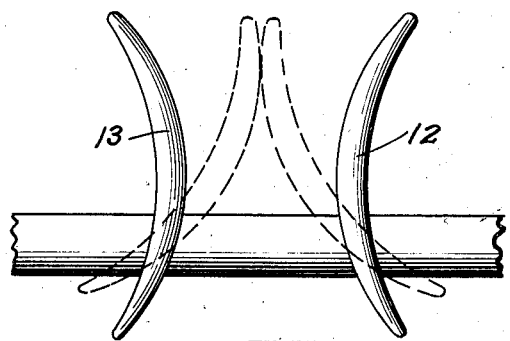
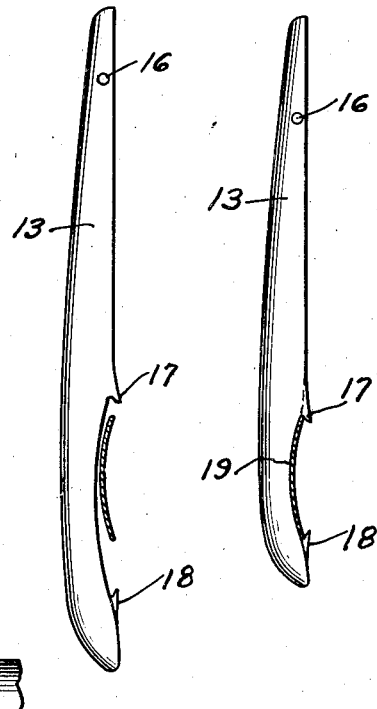
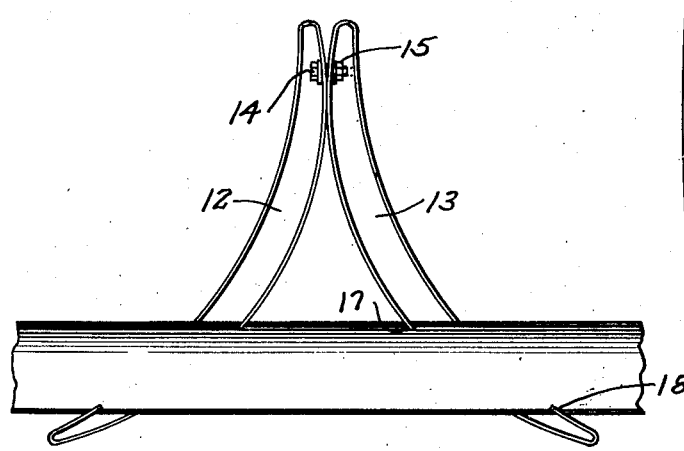
Inventor
GEORGE ALBERT LYON.
by Patented Jan. 2, 1940

2,185,468

UNITED STATES PATENT OFFICE 2,185,468

ORNAMENTAL BUMPER ACCESSORY

George Albert Lyon, Allenhurst, N. J.

Application July 29, 1937, Serial No. 156,283

19 Claims. (Cl. 293—55)

This invention relates to an ornamental bumper accessory, and more particularly to an accessory which will increase the protection afforded by the bumper and which may be detachably secured to a bumper without drilling holes in the latter or otherwise altering or marring its construction.

Although the usual vehicle bumper or impact member, which is universally employed on automobiles of the present day, is satisfactory under most circumstances, it has been found that in many instances it is desirable to increase the protection which is afforded by the bumper or impact member by mounting thereon an auxiliary guard or impact member which extends centrally upwardly from the main bumper. This has been found to be particularly desirable where a cast grille radiator front is used on the vehicle. The increased protection which is afforded by the auxiliary impact member prevents overhanging objects or unusually high bumpers on other vehicles from riding over the top of the main bumper and breaking the relatively expensive cast grille radiator front. In view of the fact that the auxiliary impact member can only be secured at its lower end, it is highly important that it be constructed of material which is sufficiently strong to resist the usual impact to which a vehicle bumper is subjected and also be secured to the vehicle bumper in such a manner that it cannot be ripped off. From a commercial standpoint, it is also desirable that the auxiliary impact member or guard be equipped with a mounting means which will permit the impact member or guard to be readily and quickly mounted on a vehicle bumper and preferably without altering the form and construction of the bumper. The last feature permits the auxiliary guard or impact member to be mounted on vehicle bumpers which are already in use.

It is an object of this invention to provide a novel ornamental bumper accessory or impact member having the above highly desirable characteristics.

Another object of this invention is to provide a novel bumper accessory or impact member which is economical to manufacture and which is rugged and reliable in use.

A further object of this invention is to provide a novel bumper accessory or impact member which may be detachably mounted on a vehicle bumper by means carried solely by the auxiliary impact member.

A still further object of this invention is to provide a novel means for securing a bumper accessory or impact member to a vehicle bumper or other cross bar.

The novel features which I believe to be characteristic of my invention are set forth with particularity in the appended claims. My invention itself, however, both as to its organization and manner of construction, together with further objects and advantages thereof, may best be understood by reference to the following description, taken in connection with the accompanying drawing, in which:

Figure 1 is a front elevational view of a bumper having an ornamental bumper accessory embodying the features of the present invention mounted thereon;

Figure 2 is a side elevational view partly in cross section of one member of the bumper accessory showing the mounting piece thereof vertically aligned;

Figure 3 is a view similar to Figure 2 but showing the member thereof after it has been rotated to effect an engagement between the mounting piece and the bumper;

Figure 4 is a front elevational view showing the two complementary members of the ornamental member accessory in their respective positions as they are being mounted on the bumper; and Figure 5 is a rear view of the ornamental bumper accessory shown in Figure 1.

The embodiments of this invention illustrated by the various figures of the drawing include an ornamental bumper accessory or impact member 10 which is centrally mounted on the main bumper or impact member 11. The ornamental bumper accessory 10 includes two arcuate shape members 12 and 13 of channel shape cross section, which are preferably formed of a suitable grade of spring steel.

The members 12 and 13 are detachably secured together near their upper ends in some suitable manner, such as by means of a bolt 14 and a nut 15 extends through the adjacent side walls of the two members, suitable apertures 16 being provided in these walls for the purpose. As may be seen upon a cursory examination of Figure 1 of the drawing, the two members 12 and 13 diverge downwardly and outwardly from the point at which they are secured together, the lower portions of the members extending across the front face of the bumper 11.

The manner in which the ornamental bumper accessory or impact member 10 is detachably secured to the bumper 11 will now be described. Members 12 and 13 are each provided with an obliquely downwardly extending upper tooth 17 and an obliquely upwardly extending lower tooth 18. The downwardly extending upper teeth 17 are preferably formed on the inner side walls of members 12 and 13, and the lower teeth 18 are preferably formed on the outer side walls of members 12 and 13 (as may be seen best in Figure 5). The marginal edges of both side walls of each of members 12 and 13 are shaped between the complementary teeth 17 and 18 in such a manner that when the members 12 and 13 are in desired mounted position on bumper 11 this portion of the wall will intimately overlie and engage the front face of bumper 11.

In view of the fact that the axis of each pair of complementary teeth 17 and 18 is at an oblique angle in the mounted position of the ornamental bumper accessory 10, it is apparent that when each of the members 12 and 13 is in such a position that the axes of the complementary teeth 17 and 18 are substantially vertical (as shown in Figure 2), the distance between the teeth is greater than the maximum width of the bumper. After each of the members 12 and 13 has been rotated, however, the teeth 17 and 18 will be hooked over and behind the bumper in the manner shown in Figure 3. The teeth 17 and 18 which are formed on the members 12 and 13 thus provide a very satisfactory and convenient method for detachably securing the ornamental bumper accessory or impact member 10 to bumper 11.

The manner in which the bumper accessory 10 is mounted on the bumper 11 will now be described. Referring to Figure 4, the members 12 and 13 are shown in their full line position as they are being moved into position against the front face of bumper 11. When members 12 and 13 are held in the position shown by the full lines in Figure 4, teeth 17 and 18 of each member are in the position as shown in Figure 2 of the drawing, and in view of the fact that the distance between each pair of complementary teeth 17 and 18 is greater than the width of the bumper 11, it is clear that these teeth will not cause any obstruction as the members 12 and 13 are moved into position against the front face of bumper 11. After the members 12 and 13 are in the position shown by the full lines in Figure 4 and the teeth 17 and 18 are in the position shown in Figure 2, the members 12 and 13 are rotated or moved toward each other until they have assumed the position indicated by the dotted lines in Figure 4. At this time the teeth 17 and 18 of each of the members 12 and 13 will be in the position as shown in Figure 3. In this position it is to be noted that the tooth 17 of each member is hooked down over the top of the bumper 11, while the tooth 18 of each member is hooked up under the bottom of bumper 11. It should further be noted that in this position the edge of each side wall of each of members 12 and 13 intimately overlies the front face of the bumper 11 as is indicated at 19 in Figure 3. The upper ends of members 12 and 13 are finally detachably secured together by means of the nut 15 and bolt 14. As is shown in Figure 5, the bolt 14 and nut 15 are above the point at which the members 12 and 13 come into contact with each other. The tension in the bolt therefore tends to rock the two members about their point of mutual contact, which serves as a fulcrum, and tends to spread apart the lower ends of these members, increasing the angle which they make with each other and decreasing the angles at which they cross the bumper. This keeps the teeth 17 and 18 tightly fastened around the bumper so that the ornamental bumper accessory or impact member 10 cannot be knocked or jarred off bumper 11 without breaking the teeth 17 and 18 or otherwise permanently destroying the accessory.

From the above description, it will be seen that I have provided an extraordinarily simple and yet effective ornamental bumper accessory which is economical to manufacture, which is rugged and reliable in use, and which may readily and quickly be assembled on a vehicle bumper. Although the ornamental accessory has been described as being centrally disposed on the bumper 11 in order to increase protection afforded a vehicle radiator grille, it will be obvious to those skilled in the art that an accessory of the type described may be mounted in various positions and in varying numbers as desired without departing from the spirit and scope of the present invention.

While I have shown a particular embodiment of my invention, it will, of course, be understood that I do not wish to be limited thereto, since many modifications may be made, and I, therefore, contemplate by the appended claims to cover all such modifications as fall within the true spirit and scope of my invention.

I claim as my invention:

1. As an article of manufacture for vehicle bumpers, an accessory adapted to increase the protection afforded by a bumper comprising two members detachably secured together at one end and extending downwardly and outwardly into detachable engagement with a vehicle bumper, said engagement being provided by integral projections on said members which hook over and under said bumper, said projections providing the sole bumper securing means for said accessory.

2. As an article of manufacture for vehicle bumpers, an accessory adapted to increase the protection afforded by a bumper comprising two members of channel shape cross section detachably secured together at one end and extending downwardly and outwardly into detachable engagement with a vehicle bumper, each member having an integral portion of its channel side wall shaped to intimately overlie the outer face of said bumper, one of said side walls of each member having a projection extending downwardly behind said bumper and the other of said side walls of each member having a portion extending upwardly behind said bumper, thereby to secure said members to said bumper.

3. As an article of manufacture for vehicle bumpers, an accessory adapted to increase the protection afforded by a bumper comprising two members detachably secured together at one end and extending downwardly and outwardly into detachable engagement with a vehicle bumper, each member having a portion thereof shaped to overlie the front face of said bumper, and each of said members having a projection extending downwardly behind said bumper and a second projection extending upwardly behind said bumper, the distance between the upper and lower projections of each member being greater than the width of said bumper, whereby said members may be individually moved into position over said bumper and then rotated until said projections extend into engagement with the rear side of said bumper.

4. As an article of manufacture for vehicle bumpers, an accessory adapted to increase the protection afforded by a bumper comprising two arcuate members of channel shape cross section bolted together at their upper ends and diverging downwardly and outwardly into detachable engagement with a vehicle bumper, said engagement being provided by a complementary pair of projections on each member which hook over and under said bumper, the distance between projections of each complementary pair of projections being greater than the width of said bumper, whereby said members may be individually moved into position over said bumper and then rotated until said projections extend into engagement with the rear side of said bumper.

5. A bumper accessory comprising two spring steel members converging upwardly to an apex and each having means thereon for detachably securing it to a bumper, said means including a pair of complementary teeth, one tooth of which extends obliquely rearwardly and upwardly, and the other tooth of which extends obliquely rearwardly and downwardly, the shortest distance between the tips of said complementary teeth being greater than the maximum width of said bumper at the point of engagement of said members, whereby said members may be moved into position on said bumper with said teeth to the rear thereof and then rotated until the teeth engage said bumper and the upper extremities of said members engage each other, and means for detachably securing the upper ends of said members together.

6. As an article of manufacture for vehicle bumpers, an accessory adapted to increase the protection afforded by a bumper comprising two members adapted to be detachably secured together at one end and to diverge downwardly and outwardly from their point of securement, a portion of each of said members in proximity to its lower extremity being shaped to intimately overlie the front face of a bumper, each of said portions being provided with an obliquely downwardly extending tooth and an obliquely upwardly extending tooth which are adapted to engage the rear of said bumper when said members are secured together, said teeth being adapted to pass over said bumper when said downward tooth and said upward tooth are vertically aligned, and means for securing the upper ends of said members together after said complementary teeth have been passed over said bumper and said members have been rotated to hook said teeth behind said bumper.

7. As an article of manufacture for vehicle bumpers, an auxiliary member adapted to increase the protection afforded by a bumper comprising two members detachably secured together at one end and extending downwardly and outwardly into detachable engagement with a vehicle bumper, said engagement being provided by integral teeth on each of said members which engage said bumper, said teeth providing the sole bumper securing means for said auxiliary member.

8. As an article of manufacture for vehicle bumpers, an auxiliary member adapted to increase the protection afforded by a bumper comprising two arcuate shaped members detachably secured together at their upper ends and diverging downwardly and outwardly into detachable engagement with a vehicle bumper, said engagement being provided by a plurality of integral teeth on said members which extend above and below said bumper.

9. As an article of manufacture, a bumper guard constructed to be applied vertically to the bumper bar and to be angled under pressure into wedged retaining engagement with the bar, said guard having angled portions movable in opposite directions to grip the bumper bar and impelled into operative gripping position by pressure applying means, said means including tightening and tensioning means applied to the top of the guard for forcing said angled portions into tight cooperation with the bumper bar.

10. As an article of manufacture, an auxiliary multi-impact member assembly for vehicle bumpers comprising a pair of downwardly diverging impact legs, each of said legs having a pair of complementary teeth thereon extending over and under the upper and lower edges respectively of a vehicle bumper, and means for urging said legs apart.

11. As an article of manufacture, an auxiliary multi-impact member assembly for vehicle bumpers comprising a pair of downwardly diverging impact legs, each of said legs having a pair of complementary teeth thereon extending over and under the upper and lower edges respectively of a vehicle bumper, and means for applying a force tending to decrease the angle which each leg makes with said bumper.

12. As an article of manufacture, an auxiliary multi-impact member assembly for vehicle bumpers comprising a pair of downwardly diverging impact legs, each of said legs having a pair of complementary teeth thereon extending over and under the upper and lower edges respectively of a vehicle bumper, and a clamping member engageable solely with the upper ends of said legs for holding them together and for spreading said legs apart.

13. In combination with a horizontally extending vehicle bumper, a pair of upwardly extending converging impact legs, each of said legs having a pair of complementary teeth in proximity to their lower ends extending over and under the upper and lower edges respectively of said bumper, and adjustable means for applying a force tending to decrease the angle which each leg makes with said bumper.

14. The combination comprising a horizontally extending bumper bar, a vertical interlock preventing guard having portions extending down behind and up behind the upper and lower edges respectively of said bumper, and means for securing said guard to said bumper including adjustable means for displacing said upper and lower portions of said guard with respect to each other in the direction of the length of said bumper.

15. The combination comprising a horizontally extending bumper bar, a vertical interlock preventing guard having obliquely rearwardly converging portions passing over and under the upper and lower edges, respectively, of said bumper bar, and adjustable means for displacing said upper and lower portions in the direction of the length of the bumper with respect to each other, whereby said obliquely rearwardly converging portions are maintained in tight engagement on said bumper bar.

16. In a bumper construction, means for increasing the impact area of a bumper comprising one member formed to interlock with the bumper when it is rotated in one direction, a second member formed to interlock with the bumper when it is rotated in a direction opposite to the first direction, and means for holding said members in the positions to which they are rotated to cause them to interlock with said bumper.

17. In a bumper construction, means for increasing the impact area of a bumper comprising one member formed to interlock with the bumper when it is rotated in one direction, a second member formed to interlock with the bumper when it is rotated in a direction opposite to the first direction, and means for applying opposite torques to said two members.

18. In a bumper construction, means for increasing the impact area of a bumper comprising one member formed to interlock with the bumper when it is rotated in one direction, a second member formed to interlock with the bumper when it is rotated in a direction opposite to the first direction, and means acting only on said members for holding said members in the positions to which they are rotated to cause them to interlock with said bumper.

19. In a bumper construction, means for increasing the impact area of a bumper comprising one member formed to interlock with the bumper when it is rotated in one direction, a second member formed to interlock with the bumper when it is rotated in a direction opposite to the first direction, and means acting only on said members for applying opposite torques to said two members.

GEORGE ALBERT LYON.